Feb. 27, 1923.
T. MARTIN
1,446,805
AUTOMOBILE FENDER
Filed June 29, 1922
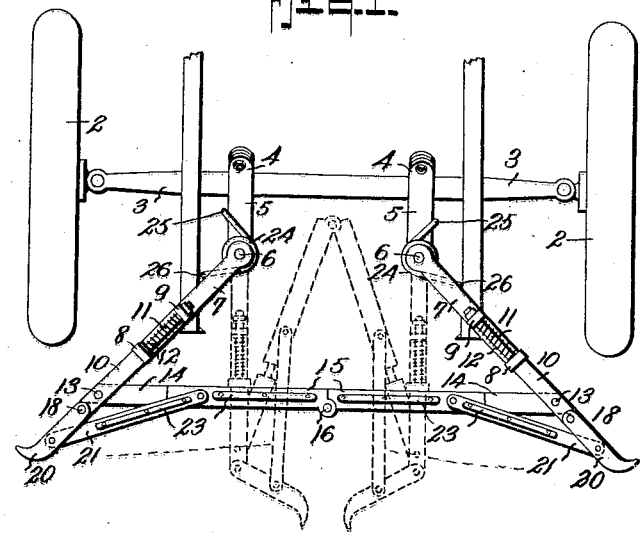
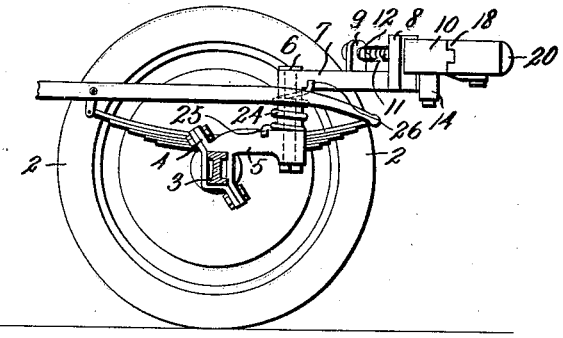
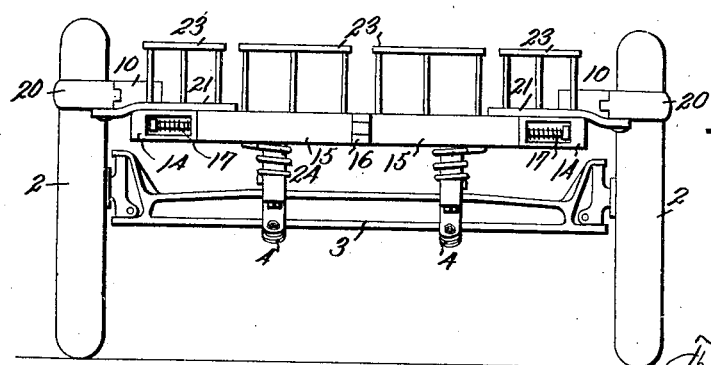
Inventor
Thomas Martin.
By Fred G. Dieterich
Attorneys Patented Feb. 27, 1923.

1,446,805

UNITED STATES PATENT OFFICE.

THOMAS MARTIN, OF VERNON, BRITISH COLUMBIA, CANADA.

AUTOMOBILE FENDER.

Application filed June 29, 1922. Serial No. 571,746.

*To all whom it may concern:*

Be it known that I, THOMAS MARTIN, citizen of Canada, residing at Vernon, in the Province of British Columbia, Canada, have invented certain new and useful Improvements in Automobile Fenders, of which the following is a specification.

This invention relates to a safety fender for automobiles and is designed to be supported from the leading axle of the vehicle to project forward therefrom at approximately the mid-height of an average pedestrian, the fender being designed that the front bar of it on encountering such an obstruction, will yield backward and close toward the middle line of the car, in a manner to break the shock of impact and sustain the impacting body to prevent it passing under the wheels of the car.

The invention is particularly described in the following specification, reference being made to the drawings by which it is accompanied, in which:

Fig. 1 is a plan of the device showing its connection to the axle of the leading wheels, the dot and dash lines indicating the position of the fender on meeting an obstruction such as calls it into operation.

Fig. 2 is a side elevation of the same with the adjacent wheel removed.

Fig. 3 is an end view of Fig. 1.

In these drawings 2 represents the leading wheels, and 3 the axle connecting and supporting them. Around the axle 3 two clamps 4 are secured on it at approximately a quarter the wheel gauge from each wheel. The upper member of each clamp is produced as at 5 and in its outer end a pin 6 is secured to project vertically upward.

Pivotally mounted on each pin 6 is an arm 7 from the outer end of which a lug 8 upwardly projects, and intermediate its ends a second lug 9. The outer lug 8 is apertured to slidably receive the rectangular portion 10 of an extension bar, the reduced cylindrical end of which 11 passes through a corresponding aperture in the intermediate lug 9. The end of 11 has a collar secured on it limiting its outward movement.

Between the shoulder of each extension member 10, 11 and the adjacent face of the intermediate lug 9 of the arm 7 is a coil spring 12 normally holding the extension member at the outer limit of its movement and resisting movement inward. The two arms 7 and their extension 10 are normally held angularly apart by an articulated cross brace 14, 15, the parts 14 being connected at 13 adjacent the ends of 10, and the inner members 15 being pin-connected together at 16 with a stop joint that limits movement outward beyond the straight line, but permits movement inward to the position indicated by the dot and dash lines in Fig. 1.

These members 14 and 15 are connected together to be extensible against a spring resistance, the outer end of each member 15 being reduced to a round rod to pass through a bearing in the adjacent inner end of each member 14 with a spring 17 in an elongated slot or aperture provided in 14 and acting between the end of the bearing of 14 and a collar secured on the rounded end of 15.

Pivotally connected at 18 to the extreme end of each extension member 10 is a retaining member 20, the end of which is rounded and slightly turned outward, as shown in Fig. 1.

These retaining members 20 are connected by links 21 to each inner member 15 of the articulated cross brace, so that as the middle of that cross brace pivots at 16 on encountering an obstacle, the side arms 7 and their extensions 10 are drawn inward and the retaining members 20 are, by the links 21, drawn toward one another to close the opening to the space between the arms 7 and their extensions, as shown by the dot and dash lines in Fig. 1.

To facilitate movement of the side arms 7 and their extensions 10 toward one another when the articulated cross brace 14, 15 is moved backward on its pin 16 as when an obstacle is encountered, a coiled spring 24 is applied about the axis of each pin 6, one end of which spring bears at 25 on the member 5 and the other at 26 on the arm 7 so that the resilience of the spring 24 tends to move the outer ends of the arms 7 and their extensions 10 quickly together when relieved of the support of the cross brace 14, 15 as when that cross brace is moved backward from its stop joint at the pin 16.

A light fence 23, which may be padded, is secured to and projects upward from the link members 21 and from the members 15 to prevent the body from falling over the bars when struck and to more effectively sustain that body when closed upon it, as shown by the dot and dash lines in Fig. 1.

So constructed, the fender forms an effective safety appliance. The quick backward movement of the centre of the cross brace 14, 15 will lessen the shock on the pedestrian with which it may contact, and the corresponding rapid closure of the side arms 7 and their extensions 10 carrying the link members 21 and the padded fences 23 will retain the body and prevent it falling under the machine.

Having now particularly described my invention, I hereby declare that what I claim as new and desire to be protected in by Letters Patent, is:

1. An automobile fender, comprising in combination, arms pivotally mounted on the leading axle of the vehicle and projecting angularly forward and outward therefrom, a cross brace pivotally connected to these arms and extending between them which brace is articulated in the middle line to move backward toward the axle and draw the radial arms inward.

2. An automobile fender, comprising in combination, arms pivotally mounted on the leading axle of the vehicle and projecting angularly forward and outward therefrom, in front of the wheel on each side, a cross brace pivotally connected to these radial arms and extending between them, which brace is articulated in the middle line and provided with a stop joint and springs tending to draw the radial arms together when the brace bar is moved backward off the stop joint.

3. An automobile fender, comprising in combination, arms pivotally mounted on the leading axle of the vehicle and projecting angularly forward and outward therefrom in front of the wheel on each side, a cross brace pin connected between the outer ends of these arms which brace is articulated in the middle line to move backward toward the axle and has a stop preventing outward movement, springs tending to move the arms together, a short member pin-connected to the outer end of each arm beyond the connection of the brace thereto, and a link between the last named member and the cross brace adjacent.

4. An automobile fender, comprising in combination, arms pivotally mounted on the leading axle of the vehicle and projecting angularly forward and outward therefrom, each of said arms being formed in two parts endwise slidable in relation to one another, springs holding the arms at the outer limit of their endwise extending movement, a cross brace pin-connected to each arm adjacent its outer end which brace is articulated in the middle line to move backward toward the axle and has a stop at the articulation preventing outward movement, each half of said brace being in two parts slidably related with a spring tending to hold the parts at the outer limit of their movement, a short member pin-connected at the outer end of each arm beyond the connection of the brace thereto, a link pin-connected to each of these short members and to the cross brace, and a fence secured to and projecting upward from each link and from each inner portion of the cross brace.

5. An automobile fender, comprising in combination a clamp member secured to and projecting forward from the axle of the vehicle, a pin secured in the outwardly projecting portion of each clamp to project upward from it, an arm mounted on each pin and projecting angularly forward and outward therefrom, each arm being in two parts endwise slidable in relation to one another a spring tending to hold the slidable parts of each arm at the outer limit of their movement, a brace pivotally connected to and extending between the arms adjacent their outer ends, said brace being articulated at its midlength to move backward toward the axle with a stop at the joint preventing movement outward, a spring on each arm tending to move them toward one another when the cross brace is moved backward off its stop, a short member pivotally connected to the outer end of each arm, a link connecting the outer end of each of these members with the cross brace and a fence on each link and on the inner portion of the cross brace.

In witness whereof I affix my signature.

THOMAS MARTIN.